(12) United States Patent
Ji

(10) Patent No.: US 11,929,656 B1
(45) Date of Patent: Mar. 12, 2024

(54) PROTECTIVE COVER FOR GENERATOR IN RUNNING STATE

(71) Applicant: Jiacheng Ji, Huizhou (CN)

(72) Inventor: Jiacheng Ji, Huizhou (CN)

( * ) Notice: Subject to any disclaimer, the term of this patent is extended or adjusted under 35 U.S.C. 154(b) by 0 days.

(21) Appl. No.: 18/361,730

(22) Filed: Jul. 28, 2023

(51) Int. Cl.
*H02K 5/04* (2006.01)
*H02K 5/00* (2006.01)
*H02K 5/02* (2006.01)

(52) U.S. Cl.
CPC ............... *H02K 5/04* (2013.01); *H02K 5/00* (2013.01); *H02K 5/02* (2013.01)

(58) Field of Classification Search
CPC ............. H02K 5/04; H02K 5/00; H02K 5/02
USPC .......................................................... 310/89
See application file for complete search history.

(56) References Cited

U.S. PATENT DOCUMENTS

| | | | |
|---|---|---|---|
| 2015/0008679 A1* | 1/2015 | Janscha | H02K 5/10 312/294 |
| 2023/0010233 A1* | 1/2023 | Chen | H02K 5/04 |

* cited by examiner

*Primary Examiner* — Alexander A Singh
(74) *Attorney, Agent, or Firm* — Daniel M. Cohn; Howard M. Cohn

(57) ABSTRACT

A protective cover for a generator in a running state includes a main body, a frame, and a top cover. The main body includes side wings capable of being rolled up and unfolded down. The side wings are enclosed to define an accommodating cavity. The accommodating cavity defines an upper opening and a lower opening and is matched with the generator. The frame is arranged in the accommodating cavity and is fixedly connected with the generator. The frame is fixed with the side wings. The top cover is openable and arranged on a top portion of the main body and covers the upper opening on an upper end of the accommodating cavity. When the generator is in the running state, the protective cover is used through the frame. Especially in a humid environment, the protective cover protects the generator from short circuit and protects an operator from electric shock.

9 Claims, 7 Drawing Sheets

PROTECTIVE COVER FOR GENERATOR IN RUNNING STATE

TECHNICAL FIELD

The present disclosure relates to a technical field of protective covers, and in particular to a protective cover for a generator in a running state.

BACKGROUND

A generator is a mechanical device that converts other forms of energy into electrical energy. The generator is generally driven by a power machinery, such as a water turbine, a steam turbine, a diesel engine, etc. The power machinery converts energy generated by water flow, air flow, fuel combustion or nuclear fission into mechanical energy and transmits the mechanical energy to the generator. Then the generator coverts the mechanical energy into the electrical energy.

There are a variety of protective covers on the market. The protective covers are configured to cover the generator to protect the generator from dust. At present, most protective covers on the market cannot be used when the generator is running because there is no frame arranged inside the protective covers. As a result, the protective covers can only be used as dust covers. Some protective covers on the market that are able to be used when the generator is running are all of fan-shaped structures, and side wings thereof are unfoldable. Generally, the side wings are connected with side frames of the generator, the frame thereof are framed with fiberglass rods, and the top cover thereof is not detachable. Therefore, it is inconvenient to add fuel to the generator and it is very inconvenient to use the generator. Thus, it is necessary to improve the protective covers on the market.

SUMMARY

In view of this, aiming at deficiencies in the prior art, a main purpose of the present disclosure is to provide a protective cover for a generator in a running state, which effectively solves a problem of inconvenient use of conventional protective covers.

To achieve the above purpose, the present disclosure provides a protective cover for the generator in the running state. The protective covers comprises a main body, a frame, and a top cover.

The main body comprises side wings capable of being rolled up and unfolded down. The side wings are enclosed to define an accommodating cavity. The accommodating cavity defines an upper opening and a lower opening. The accommodating cavity is matched with the generator. The frame is arranged in the accommodating cavity and is fixedly connected with the generator. The frame is fixed with the side wings. The top cover is openable and arranged on a top portion of the main body and covers the upper opening on an upper end of the accommodating cavity.

Optionally, the side wings are cloth.

Optionally, there are four side wings. The accommodating cavity enclosed by the four side wings is square.

Optionally, the top cover and the side wings are fastened by male buckles and female buckles. The male buckles are buckled with the female buckles to fix the side wings in a rolled state.

Optionally, the male buckles are fixed on upper-middle portions of inner side surfaces of the side wings. The female buckles are fixed to edges of the top cover.

Optionally, each of the male buckles is connected with a first woven tape fixed on a corresponding side wing of the side wings. Each of the female buckles is connected with a second woven tape fixed on the top cover.

Optionally, the top cover comprises edges. A wing plate is arranged on each of the edges of the top cover.

Optionally, the frame is a stainless steel frame formed by assembling stainless steel pipes and plastic connecting pieces.

Optionally, the frame is fixed on a top bracket of the generator through at least one hook-and-loop fastener strap.

Compared with the prior art, in the present disclosure, the protective cover is able to be used when the generator is in the running state through the frame arranged in the accommodating cavity. Especially in a humid environment, the protective cover protects the generator in the running state from short circuit and protects an operator from electric shock. The top cover of the protective cover is a flat structure instead of a raised fan-shaped structure, which reduces most of wind resistance. Moreover, each of the side wings is capable of being rolled up and hung on the top cover according to needs, and the top cover is opened to add fuel to the generator, which is convenience to use.

Figure 1:
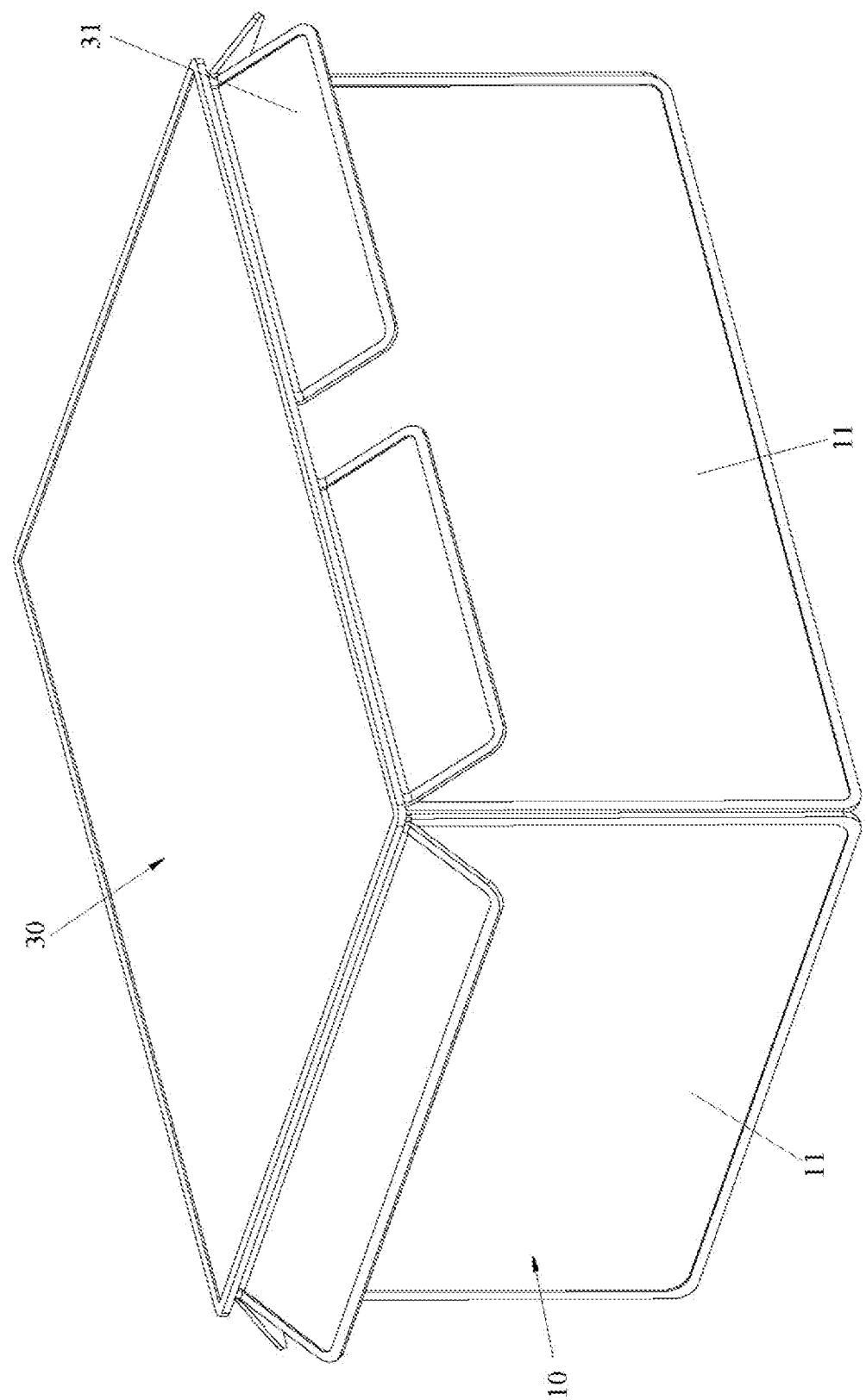
FIG. 1 is a perspective schematic diagram of a protective cover for a generator in a running state according to one optional embodiment of the present disclosure.

In the drawings: 10—main body; 11—side wing; 101—accommodating cavity; 20—frame; 21—stainless steel pipe; 22—plastic connecting piece; 30—top cover; 31—wing plate; 40—male buckle; 41—first woven tape; 50—female buckle; 51—second woven tape.

DETAILED DESCRIPTION

Figure 2:
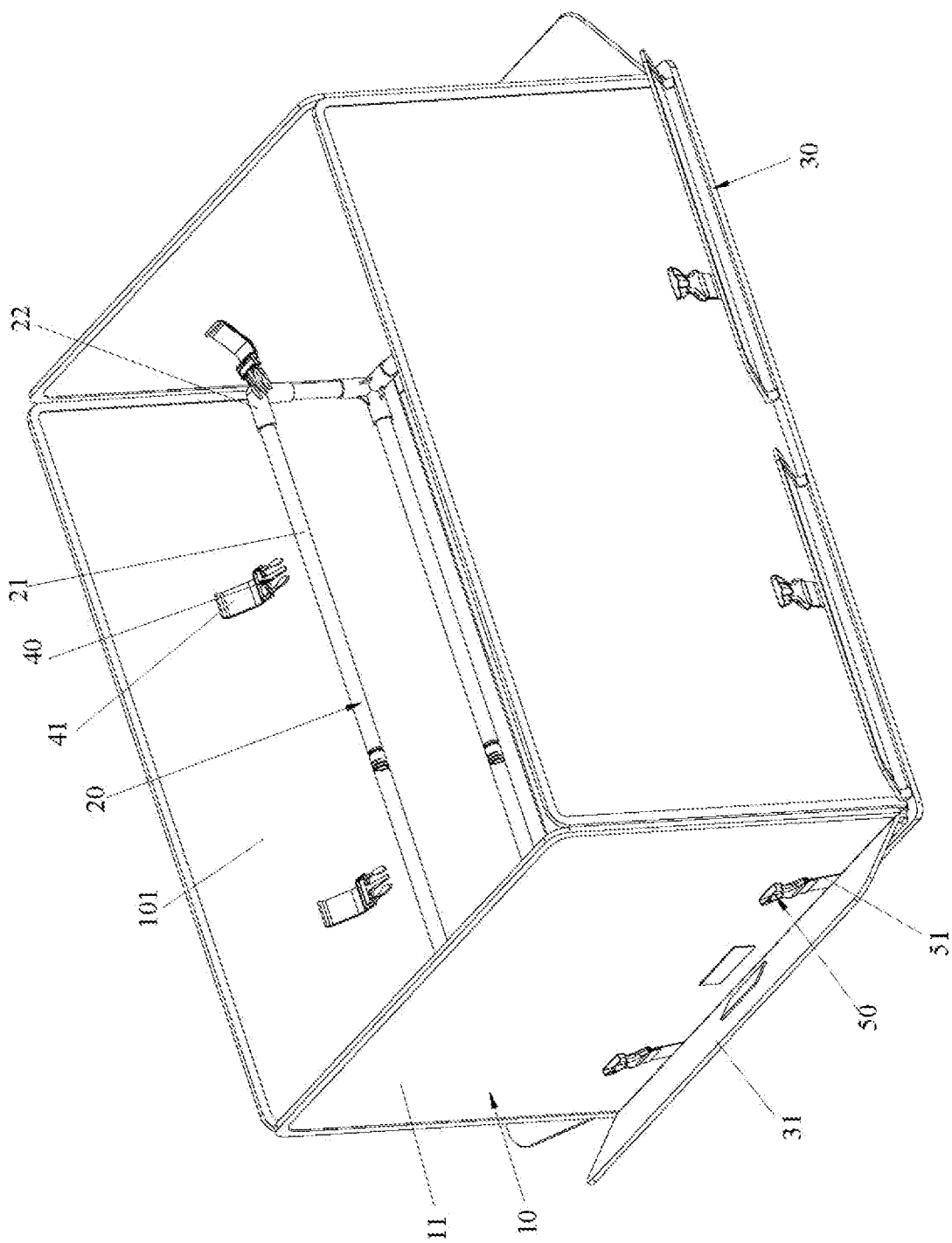
FIG. 2 is another perspective schematic diagram of the protective cover for the generator in the running state according to one optional embodiment of the present disclosure.
Figure 3:
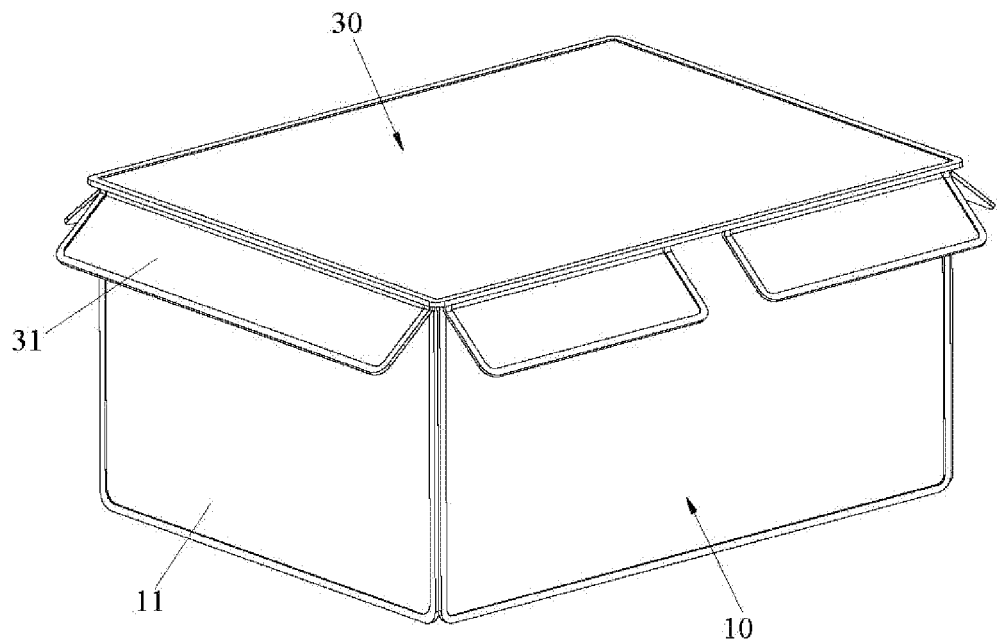
FIG. 3 is an exploded schematic diagram of the protective cover for the generator in the running state according to one optional embodiment of the present disclosure.
Figure 3:
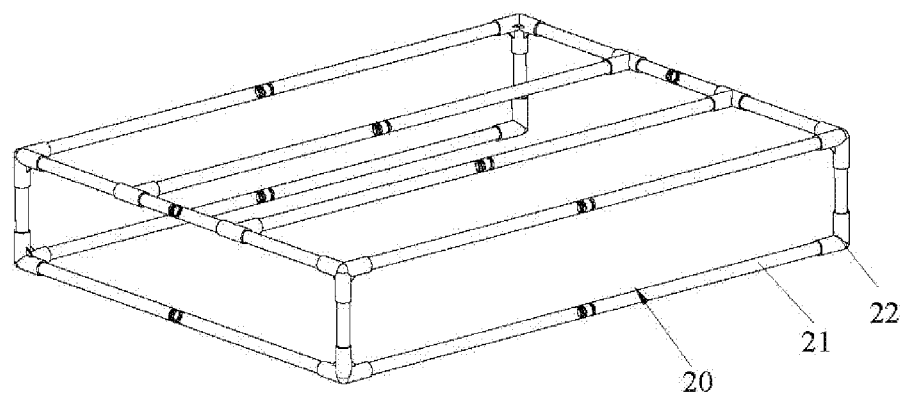
Figure 4:
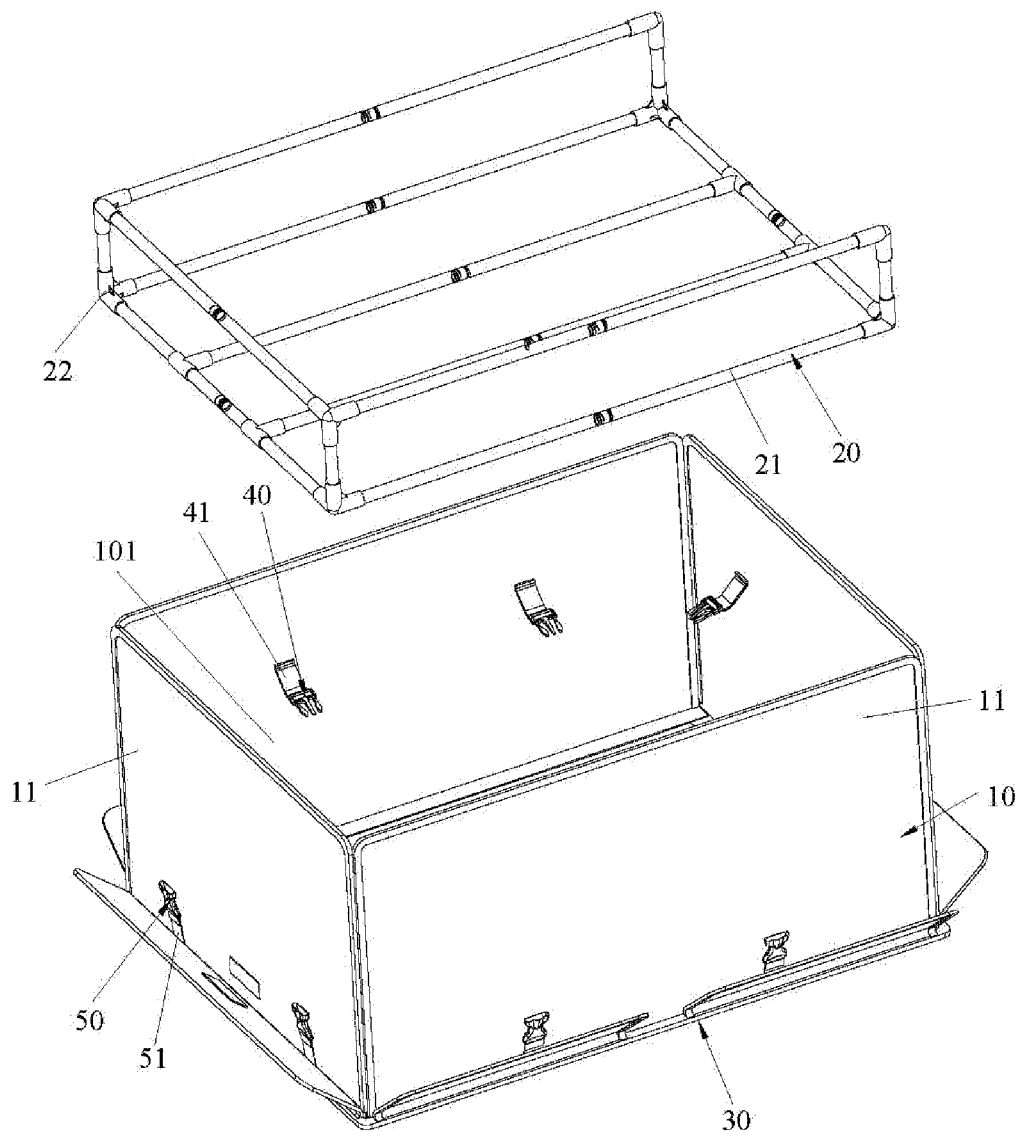
FIG. 4 is another exploded schematic diagram of the protective cover for the generator in the running state according to one optional embodiment of the present disclosure.
Figure 5:
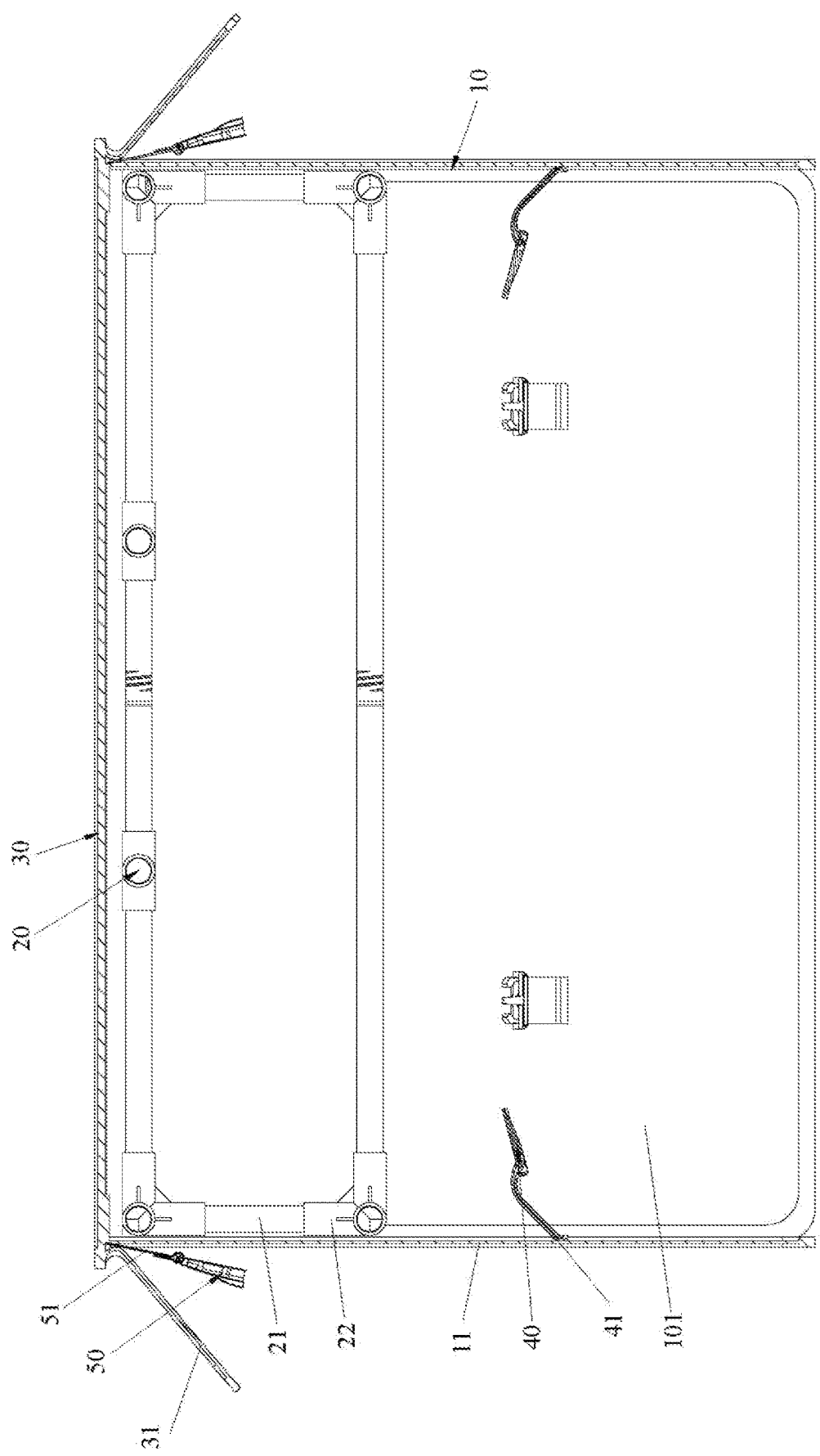
FIG. 5 is a cross-sectional schematic diagram of the protective cover for the generator in the running state according to one optional embodiment of the present disclosure.
Figure 6:
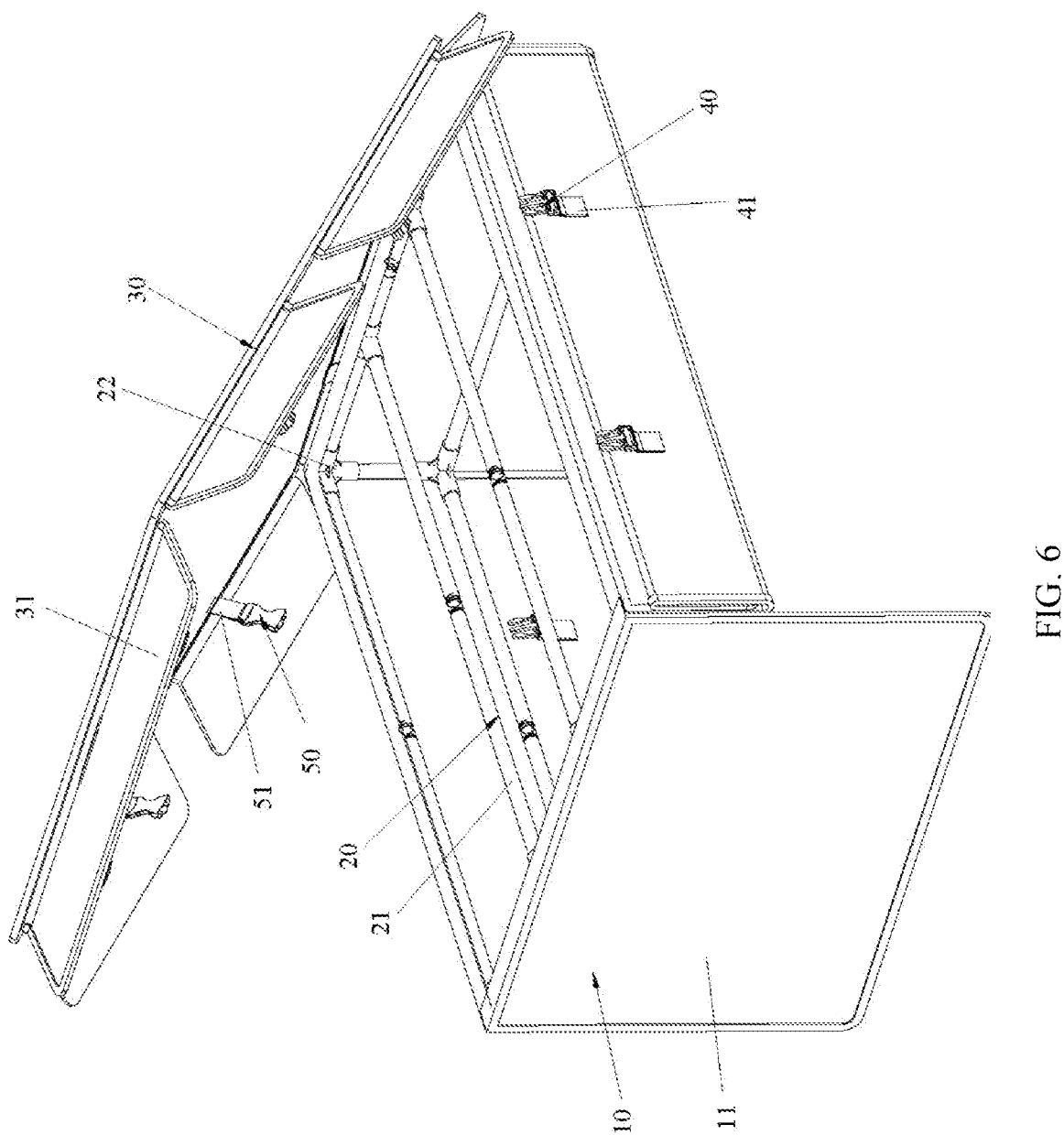
FIG. 6 is a schematic diagram of the protective cover for the generator in the running state according to one optional embodiment of the present disclosure where the protective cover is half opened and half folded.
Figure 7:
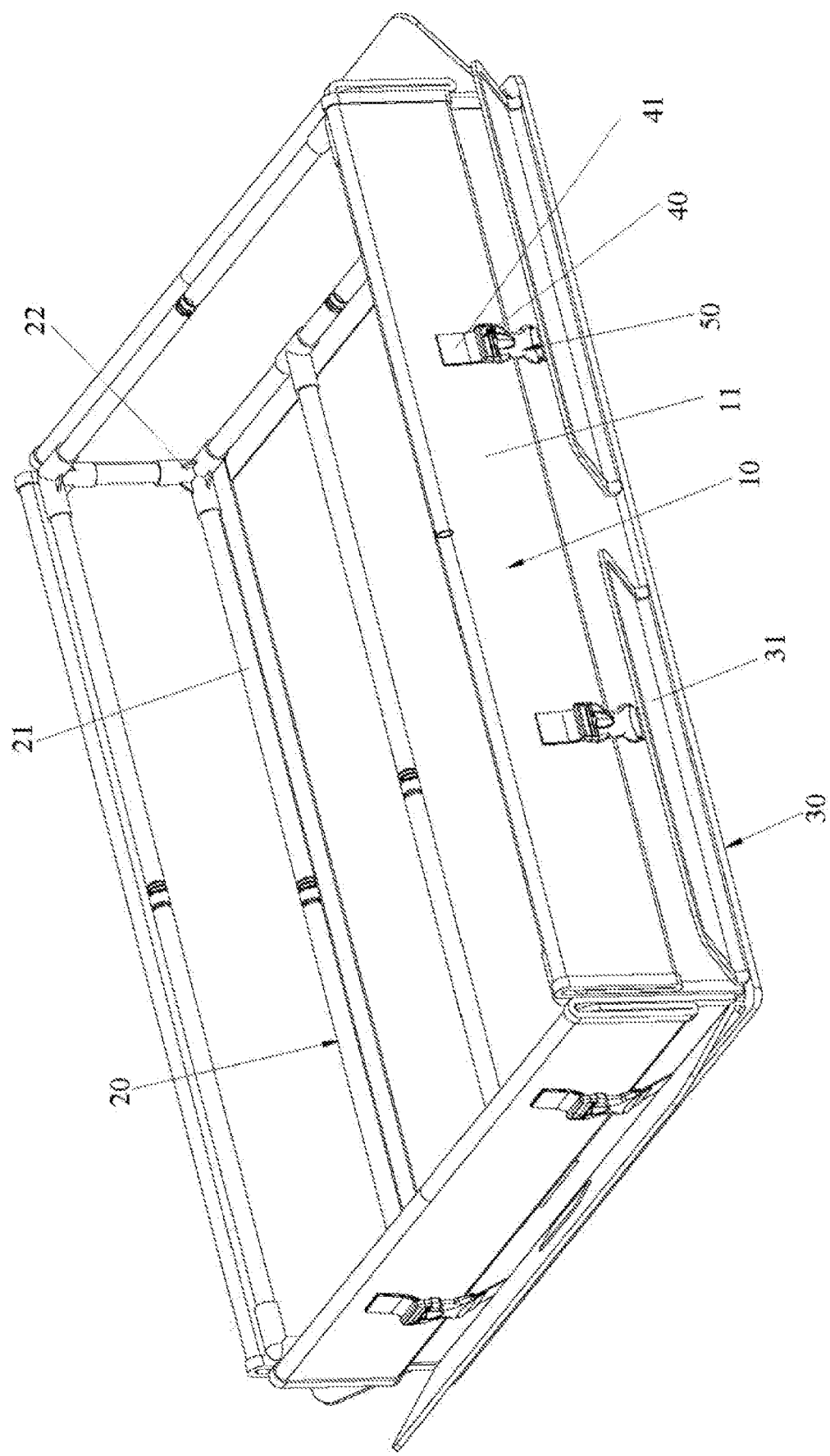
FIG. 7 is a schematic diagram of the protective cover for the generator in the running state according to one optional embodiment of the present disclosure where the protective cover is fully folded.

As shown in FIGS. 1-7, a specific structure of a protective cover for a generator in a running state of the present disclosure is shown. The protective covers comprises a main body 10, a frame 20, and a top cover 30.

The main body 10 comprises side wings 11 capable of being rolled up and unfolded down. The side wings 11 are enclosed to define an accommodating cavity 101. The accommodating cavity 101 defines an upper opening and a lower opening. The accommodating cavity 101 is matched with the generator. On the embodiment, the side wings 11 are cloth. There are four side wings 11. The accommodating cavity 101 enclosed by the four side wings 11 is square.

The frame 20 is arranged in the accommodating cavity 101 and is fixedly connected with the generator. The frame 20 is fixed with the side wings 11. In the embodiment, the frame 20 is a stainless steel frame formed by assembling stainless steel pipes 21 and plastic connecting pieces 22. Further, the frame 20 is fixed on a top bracket of the generator through at least one hook-and-loop fastener strap (not shown in the drawings).

The top cover 30 is openable and arranged on a top portion of the main body 10 and covers the upper opening on an upper end of the accommodating cavity 101.

In the embodiment, the top cover 30 and the side wings 11 are fastened by male buckles 40 and female buckles 50. The male buckles 40 are buckled with the female buckles 50 to fix the side wings 11 in a rolled state. Further, the male buckles 40 are fixed on upper-middle portions of inner side surfaces of the side wings 11. The female buckles 50 are fixed to edges of the top cover 30.

Each of the male buckles 40 is connected with a first woven tape 41 fixed on a corresponding side wing 11 of the side wings 11. Each of the female buckles 50 is connected with a second woven tape 51 fixed on the top cover 30. A wing plate 31 is arranged on each of the edges of the top cover 30.

A working process of the protective cover is ad follow.

When in use, the frame 20 is fixed on the top bracket of the generator through the at least one hook-and-loop fastener strap. After the frame 20 is fixed, the main body 10 and the frame 20 are fixed together. Finally, the top cover 30 is placed on the top portion of the main body 10 to cover the upper opening of the accommodating cavity 101.

When the generator is not in the running state, the four side wings 11 are unfolded down, and the protective cover is configured as a dust cover. When the generator is in the running state, parts of the side wings 11 need to be rolled up and fixed on the top cover 30, so that the generator fully dissipates heat and ventilation of the generator is ensured. When it is necessary to add fuel, the top cover 30 is opened to expose the generator and then the fuel is added into the generator.

In the present disclosure, the protective cover is able to be used when the generator is in the running state through the frame arranged in the accommodating cavity. Especially in a humid environment, the protective cover protects the generator in the running state from short circuit and protects an operator from electric shock. The top cover of the protective cover is a flat structure instead of a raised fan-shaped structure, which reduces most of wind resistance. Moreover, each of the side wings is capable of being rolled up and hung on the top cover according to needs, and the top cover is opened to add fuel to the generator, which is convenience to use.

The above are only specific embodiments of the present disclosure and specifically depict technical principles of the present disclosure. These descriptions are only for explaining the principles of the present disclosure, and cannot be interpreted as limiting of the protection scope of the present disclosure in any way. Based on the explanations, other specific implementations of the present disclosure obtained by those skilled in the art without creative work should fall within the protection scope of the present disclosure.

What is claimed is:

1. A protective cover for a generator in a running state, comprising:
    a main body,
    a frame, and
    a top cover;
    wherein the main body comprises side wings capable of being rolled up and unfolded down; the side wings are enclosed to define an accommodating cavity; the accommodating cavity defines an upper opening and a lower opening; the accommodating cavity is matched with the generator; the frame is arranged in the accommodating cavity and is fixedly connected with the generator; the frame is fixed with the side wings; the top cover is openable and arranged on a top portion of the main body and covers the upper opening on an upper end of the accommodating cavity.

2. The protective cover according to claim 1, wherein the side wings are cloth.

3. The protective cover according to claim 1, wherein there are four side wings; the accommodating cavity enclosed by the four side wings is square.

4. The protective cover according to claim 1, wherein the top cover and the side wings are fastened by male buckles and female buckles; the male buckles are buckled with the female buckles to fix the side wings in a rolled state.

5. The protective cover according to claim 4, wherein the male buckles are fixed on upper-middle portions of inner side surfaces of the side wings; the female buckles are fixed to edges of the top cover.

6. The protective cover according to claim 5, wherein each of the male buckles is connected with a first woven tape fixed on a corresponding side wing of the side wings; each of the female buckles is connected with a second woven tape fixed on the top cover.

7. The protective cover according to claim 1, wherein the top cover comprises edges; a wing plate is arranged on each of the edges of the top cover.

8. The protective cover according to claim 1, wherein the frame is a stainless steel frame formed by assembling stainless steel pipes and plastic connecting pieces.

9. The protective cover according to claim 1, wherein the frame is fixed on a top bracket of the generator through at least one hook-and-loop fastener strap.

\* \* \* \* \*